United States Patent
Teng et al.

(10) Patent No.: US 7,156,636 B2
(45) Date of Patent: Jan. 2, 2007

(54) NOZZLE CONTACT DEVICE OF AN INJECTION MACHINE

(75) Inventors: Ming-Chang Teng, Hsinchu (TW); Cheng-Jien Chen, Panchiao (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 222 days.

(21) Appl. No.: 11/018,245

(22) Filed: Dec. 22, 2004

(65) Prior Publication Data

US 2006/0134252 A1 Jun. 22, 2006

(51) Int. Cl.
*B29C 45/07* (2006.01)

(52) U.S. Cl. ............... 425/150; 425/569; 425/574
(58) Field of Classification Search ........... 425/574, 425/150, 569; 264/328.11
See application file for complete search history.

(56) References Cited

U.S. PATENT DOCUMENTS

| | | | |
|---|---|---|---|
| 3,416,187 A * | 12/1968 | Chartier | 425/574 |
| 3,647,309 A * | 3/1972 | Thompson | 425/139 |
| 4,676,730 A | 6/1987 | Yamasaki | 425/569 |
| 6,039,559 A * | 3/2000 | Eppich | 425/574 |
| 6,709,263 B1 * | 3/2004 | Maurilio | 425/574 |
| 2002/0132026 A1 * | 9/2002 | Maurilio | 425/574 |

* cited by examiner

*Primary Examiner*—Joseph S. Del Sole
*Assistant Examiner*—Emmanuel S. Luk
(74) *Attorney, Agent, or Firm*—Rabin & Berdo, P.C.

(57) ABSTRACT

A nozzle contact device of an injection machine has an injection device, a nozzle, a flexible body, a tension buffer device and a tension-measuring device. The nozzle is installed a front side of the injection device. The flexible body is used to drive the injection device to contact or separate from a mold. The tension buffer device is installed at a lateral side of the flexible body, and has an elastic body for receiving tension from the flexible body and decomposing the tension to form a component force and a displacement. The tension-measuring device is used to measure the displacement of the tension buffer device and deciding a contact force between the nozzle and the mold.

6 Claims, 4 Drawing Sheets

NOZZLE CONTACT DEVICE OF AN INJECTION MACHINE

BACKGROUND OF THE INVENTION

1. Field of the Invention

The present invention relates to a nozzle contact device of an injection machine, and particularly relates to nozzle contact device for setting a contact force between a nozzle and a mold to reduce the cost.

2. Description of the Related Art

Within the next few years, the development of various injection methods is adapted to an injection mold machine. However, a contact method between a mold and a nozzle of an injection device does not change substantially. An oil pressure injection machine has an oil pressure cylinder used to produce nozzle contact force. A nozzle contact device of an all-electric injection machine has a motor and a ball screw, and the motor drives the ball screw to produce nozzle contact force. However, the ball screw is expensive and time-consuming to produce, and it is hard to assemble and maintain the ball screw.

FIG; 1 shows. the all-electric nozzle contact machine of prior art according to U.S. Pat. No. 4,676,730. A nozzle contact method of the all-electric nozzle contact machine uses a motor 90 to drive a screw 91 for transforming the rotation action into the straight action, and then drives an injection device 92 to bring nozzle 93 into contact with mold 94. The all-electric nozzle contact machine has an elastic body 95 such as, for example, a disk spring or a compressed spring for holding the nozzle contact force between the nozzle 93 and the mold 94. The motor 90 provides a power of the nozzle contact force between the nozzle 93 and the mold 94.

Hence, the oil pressure cylinder of the oil pressure injection machine is used to produce nozzle contact force. With regard to the all-electric nozzle contact device, the motor drives the ball screw to transform the rotation action into the straight action for producing nozzle contact force. The oil pressure injection machine adjusts pressure for adjusting the pressure of the nozzle contact force. The motor of the all-electric nozzle contact device is driven continuously for compressing or twisting the elastic body to change shape, and then deciding the nozzle contact force according to the change.

Therefore, the injection machine of the prior art does not need accurate control according to the above description. The ball screw does not need to be used in the injection machine, or it will increase the cost for assembling the ball screw.

SUMMARY OF THE INVENTION

The present invention provides a nozzle contact device of an injection machine. The nozzle contact device can achieve sufficient nozzle contact force, is simple in structure, saving cost, and it is easy to process and assemble.

One aspect of the invention is a nozzle contact device of an injection machine. The nozzle contact device includes an injection device, a nozzle, a flexible body, a tension buffer device and a tension-measuring device. The nozzle is installed on a front side of the injection device. The flexible body is used to drive the injection device into contact with or to separate from a mold. The tension buffer device is installed at a lateral side of the flexible body, and has an elastic body for receiving tension from the flexible body and decomposing the tension to form a component force and a displacement. The tension-measuring device is used to measure the displacement of the tension buffer device and decide a contact force between the nozzle and the mold.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objectives and advantages of the present invention will be more readily understood from the following detailed description when read in conjunction with the appended drawing, in which.

DETAILED DESCRIPTION OF PREFERRED EMBODIMENTS

Figure 1:
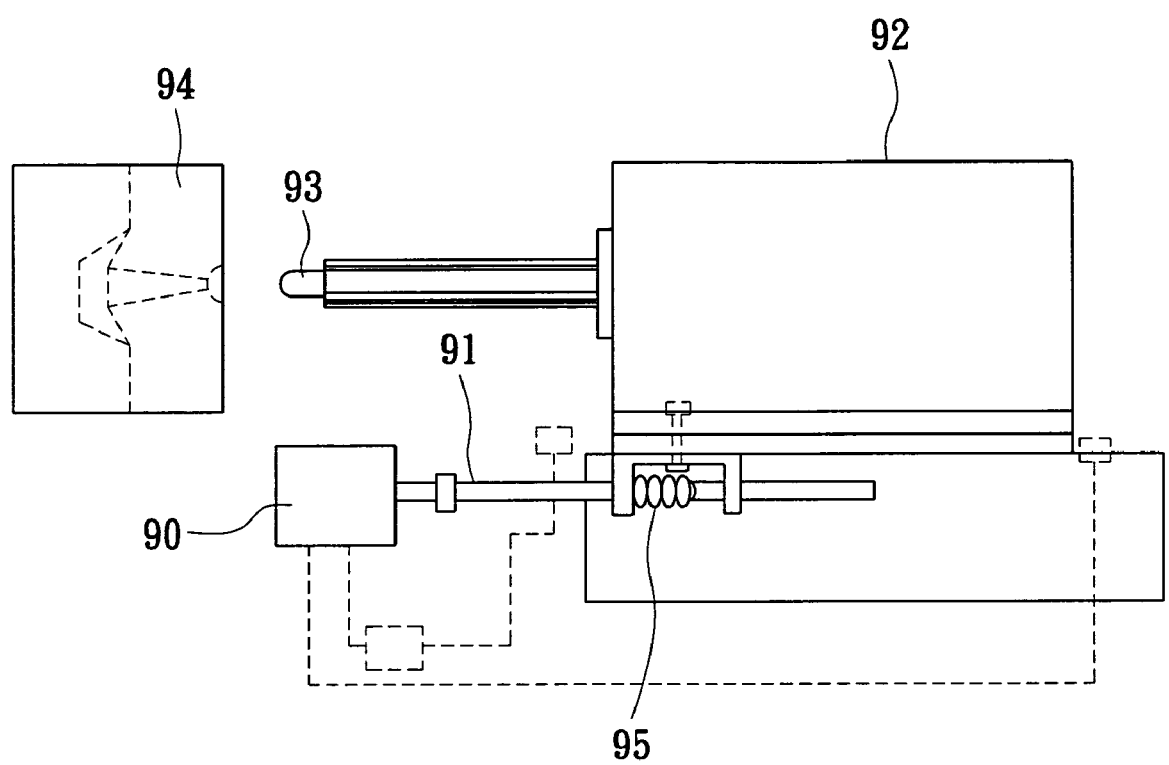
FIG. 1 is a schematic view of an all-electric nozzle contact device of the prior art.
Figure 2:
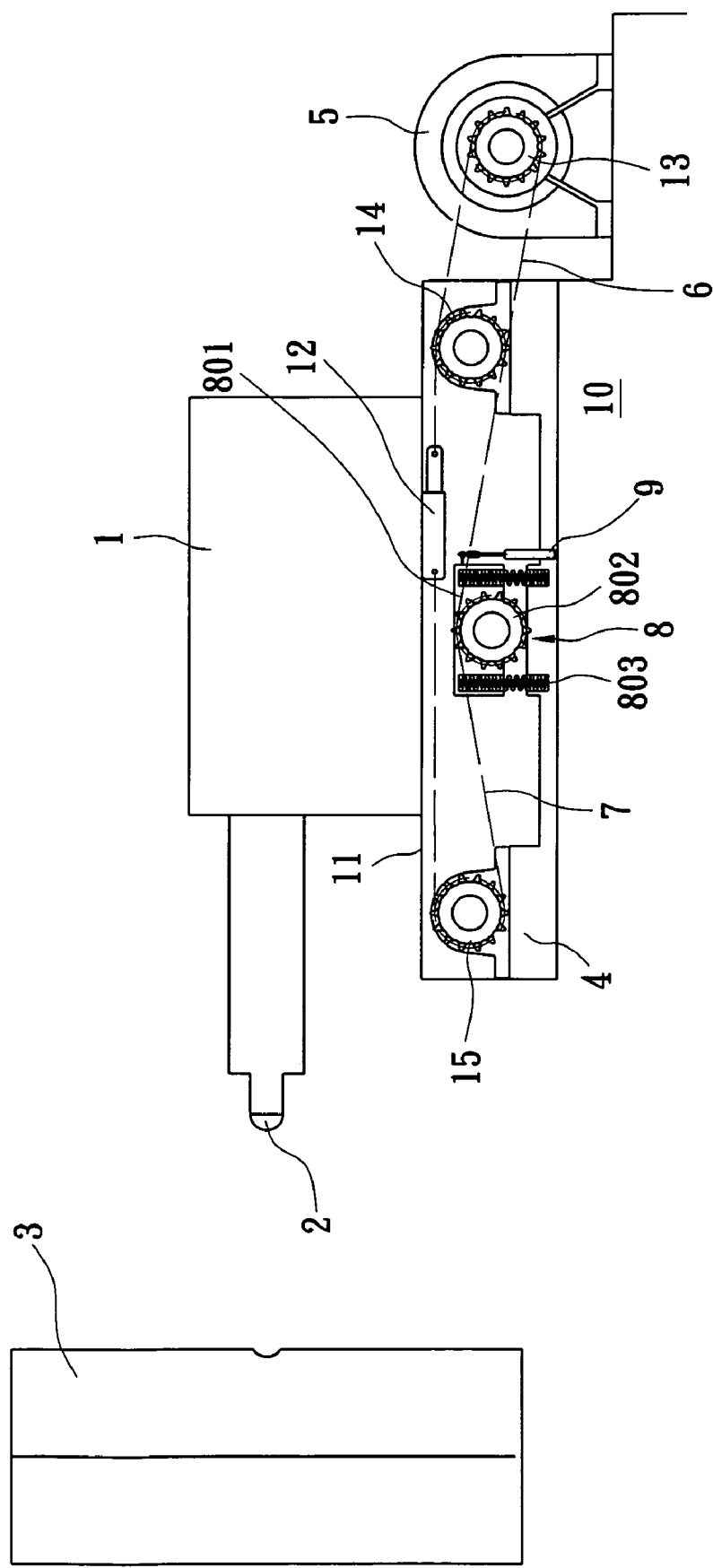
FIG. 2 is a schematic view of when a nozzle and a mold are separated from each other by a nozzle contact device of the present invention.
Figure 3:
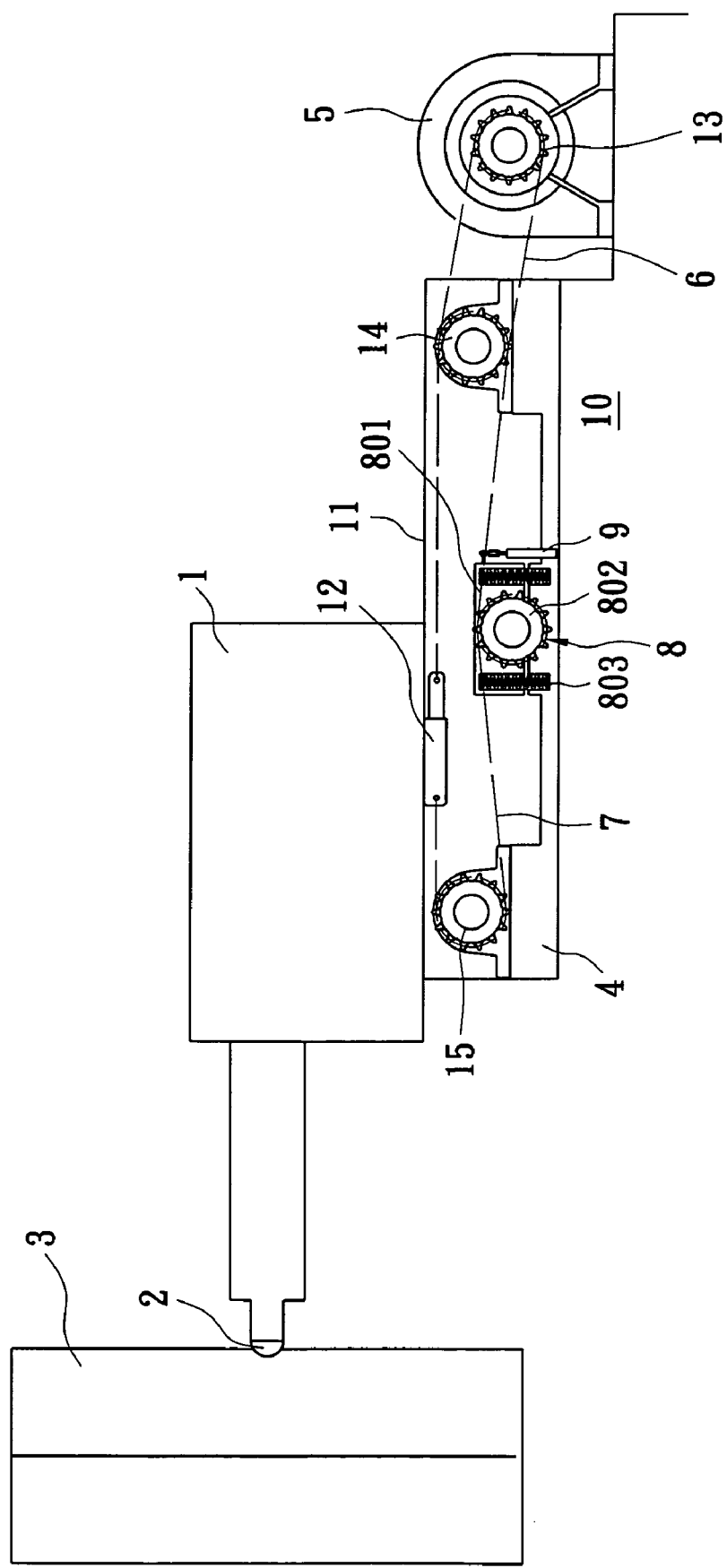
FIG. 3 is a schematic view of when a nozzle and a mold are brought into contact with each other by a nozzle contact device of the present invention.
Figure 4:
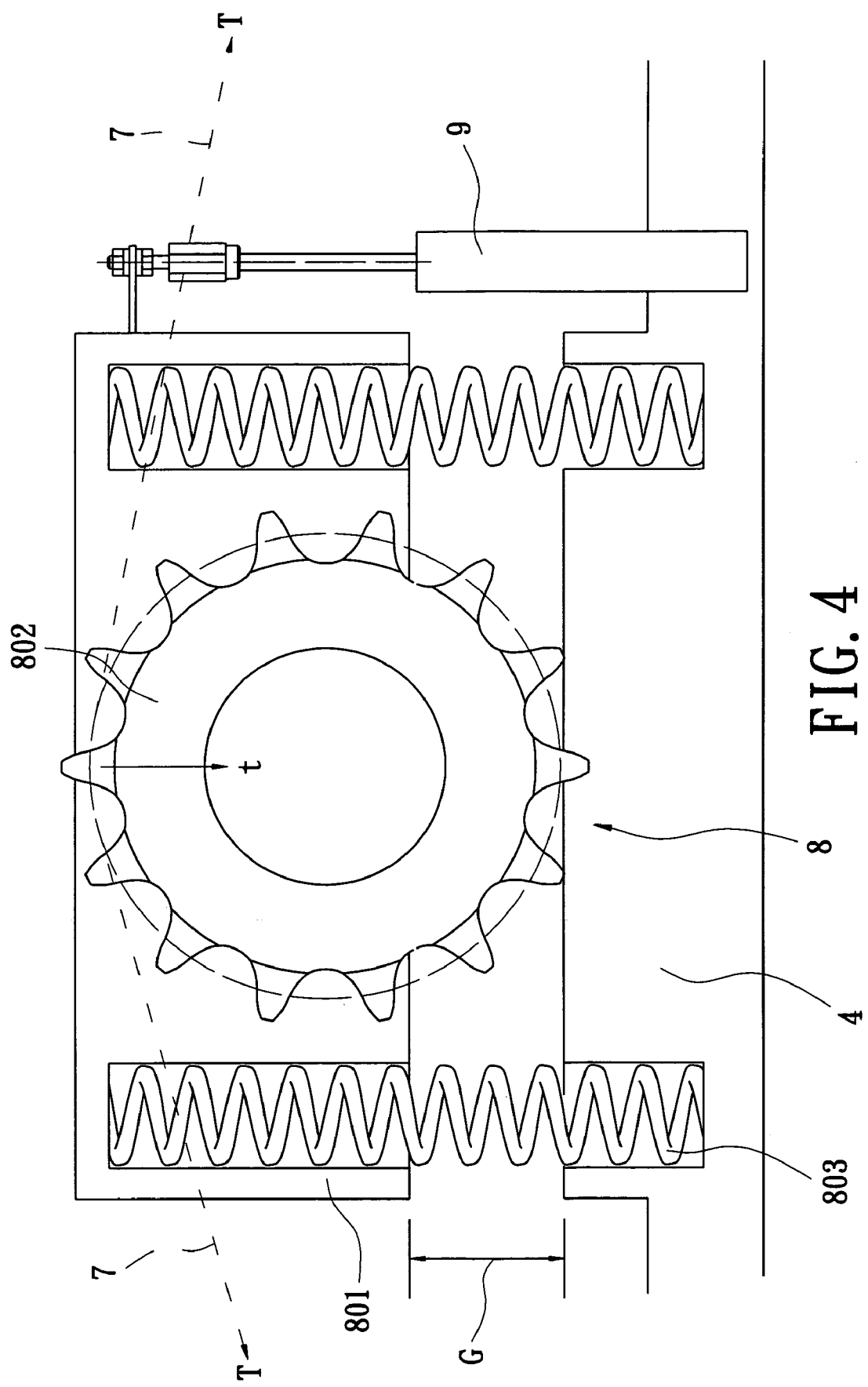
FIG. 4 is a partial, schematic view of a nozzle contact device of the present invention.

Referring to FIGS. 2–4, the present invention provides a nozzle contact device of an injection machine. The nozzle contact device includes an injection device 1, a nozzle 2, a mold 3, a bottom base 4, a driving motor 5, a transmitting chain 6, a moving chain 7, a tension buffer device 8 and a tension-measuring device 9. Both the bottom base 4 and the driving motor 5 are locked on a main body 10. The injection device 1 is installed on the bottom base 4. The nozzle contact device further has a sliding surface 11 formed between the injection device 1 and the bottom base 4. The injection device 1 slides on the sliding surface 11. The injection device 1 has a connection block 12 fixed thereunder. The nozzle 2 is installed at a front side of the injection device 1. The nozzle 2 can contact or separate from the mold 3 by the forward and backward movement of the injection device 1.

A first chain wheel 13 is installed on a spindle device of the driving motor 5. A second chain wheel 14 and a turning chain wheel 15 are installed on the bottom base 4. The transmitting chain 6 is installed between the first chain wheel 13 and the second chain wheel 14 for driving the first chain wheel 13 and the second chain wheel 14 to rotate at the same time. The moving chain 7 is installed between the second chain wheel 14 and the turning chain wheel 15. The second chain wheel 14 drives the moving chain 7 to rotate. The moving chain 7 has two sides; one side of the moving chain 7 is fixed at a rear side of the connection block 12 of the injection device 1, and another side of the moving chain 7 is fixed at a front side of the connection block 12 of the injection device 1 after surrounding the turning chain wheel 15, for driving the injection device 1 to slide or move on the sliding surface 11. Hence, the nozzle 2 can contact or separate from the mold 3 by the forward and backward movement of the injection device 1. The present invention can use a belt or another flexible element instead of the moving chain 7.

The tension buffer device 8 is disposed over the bottom base 4 and under the moving chain 7, and between the second chain wheel 14 and the turning chain wheel 15. The tension buffer device 8 is installed on a lateral side of the moving chain 7, and has a movable seat 801, a tension buffer chain wheel 802 and a plurality of elastic bodies 803. The movable seat 801 can be upwardly and downwardly movably installed over the bottom base 4. The tension buffer chain wheel 802 is pivotally installed on the movable seat 801, and engages with the moving chain 7. The elastic bodies 803 are elastic elements such as a compression spring, and are installed between the movable seat 801 and the bottom base 4. The elastic bodies 803 and the tension buffer chain wheel 802 provide a tension to the moving chain 7, and form a gap G between the movable seat 801 and the bottom base 4.

The tension-measuring device 9 is disposed at one side of the tension buffer chain wheel 8 or any suitable place to measure the change of the gap G for determining the contact force of the nozzle 2 after calculating. The tension-measuring device 9 can be any electrical apparatus with measurement functions, anywhere, or a signal output device with a plurality of detection signals. The nozzle contact device of the injection machine is assembled from the above-mentioned components.

When the nozzle 2 and the mold 3 are separated from each other, the moving chain 7 has a pre-tension. Referring to FIG. 4, the gap G has larger space in the tension buffer device 8. When the driving motor 5 drives the transmitting chain 6, the transmitting chain 6 transmits the moving chain 7 to drive the connection block 12 and the injection device 1 to move forwardly toward the mold 3 until the injection device 1 contact the mold 3. In order to hold the contact force between the injection device 1 and the mold 3, the driving motor 5 must be driven constantly; hence the tension T of the moving chain 7 increases continuously (shown as FIG. 4). Because the tension T of the moving chain 7 produces a component force t, the elastic body 803 of the tension buffer device 8 is compressed, and a height of the gap G is changed at the same time (shown as FIG. 3). When the gap G is compressed to a set value, the driving motor 5 is stopped and held. The tension T of the moving chain 7 is used to hold the contact force between the injection device 1 and the mold 3, because the compressed force of the elastic body 803 is not released yet. The elastic body is pressed to form the gap G and a reacting force that equal to the component force t of the moving chain 7, and then the tension T of the moving chain 7 is known according to the component force t. Moreover, the tension T is equal to the contact force between the nozzle 2 and the mold 3. Therefore, the tension-measuring device 9 measures the height of the gap G to obtain the contact force between the nozzle 2 and the mold 3.

The tension buffer device 8 can decompose the tension T of the moving chain 7 to form the component force t and a displacement. Therefore, the elastic body 803 only needs a force smaller than the tension T to support the tension T of the moving chain 7. Moreover, the nozzle 2 contacts to the mold 3 and the driving motor 5 is driven unceasingly, the displacement of the component force t will be magnified by the displacement of the tension T. Hence, the tension-measuring device 9 can be used to do accurately measurement.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A nozzle contact device of an injection machine, comprising:
    an injection device;
    a nozzle installed on a front side of the injection device;
    a flexible body for driving the injection device to contact or separate from a mold;
    a tension buffer device installed at a lateral side of the flexible body, wherein the tension buffer device has an elastic body for receiving tension from the flexible body and decomposing the tension to form a component force and a displacement; and
    a tension-measuring device for measuring the displacement of the tension buffer device and deciding a contact force between the nozzle and the mold.

2. The nozzle contact device as claimed in claim 1, wherein the flexible body is a chain.

3. The nozzle contact device as claimed in claim 1, wherein the tension buffer device has a movable seat, a tension buffer chain wheel and a plurality of elastic bodies, and the movable seat is upwardly and downwardly movably installed over the bottom base, wherein the tension buffer chain wheel is pivotally installed on the movable seat, and engages with the flexible body, and wherein the elastic bodies are installed between the movable seat and the bottom base, the elastic bodies and the tension buffer chain wheel provide a tension to the flexible body, and form a gap G between the movable seat and the bottom base.

4. The nozzle contact device as claimed in claim 1, wherein the tension-measuring device is an electrical apparatus with measurement functions, or a signal output device with a plurality of detection signals.

5. The nozzle contact device as claimed in claim 1, wherein the tension-measuring device is disposed at one side of the tension buffer chain wheel.

6. The nozzle contact device as claimed in claim 1, further comprising a driving motor, a transmitting chain, a first chain wheel, a second chain wheel and a turning chain wheel, the driving motor locked firmly on a main body, the injection device having a connection block fixed thereunder, the first chain wheel installed on the driving motor, the transmitting chain installed between the first chain wheel and the second chain wheel, and the flexible body installed between the second chain wheel and the turning chain wheel, and having two sides fixed a front side and a back side of the connection block.

* * * * *